(12) United States Patent
Lee et al.

(10) Patent No.: US 11,053,365 B2
(45) Date of Patent: Jul. 6, 2021

(54) METHOD OF PREPARING ION-EXCHANGE MEMBRANE USING CHEMICAL MODIFICATION AND ION-EXCHANGE MEMBRANE PREPARED THEREBY

(71) Applicant: DANKOOK UNIVERSITY CHEONAN CAMPUS INDUSTRY ACADEMIC COOPERATION FOUNDATION, Cheonan-si (KR)

(72) Inventors: Chang Hyun Lee, Seongnam-si (KR); Chang Hoon Oh, Cheonan-si (KR); Jin Pyo Hwang, Cheonan-si (KR)

(73) Assignee: DANKOOK UNIVERSITY CHEONAN CAMPUS INDUSTRY ACADEMIC COOPERATION FOUNDATION

( * ) Notice: Subject to any disclaimer, the term of this patent is extended or adjusted under 35 U.S.C. 154(b) by 49 days.

(21) Appl. No.: 16/606,217

(22) PCT Filed: Apr. 19, 2018

(86) PCT No.: PCT/KR2018/004557
§ 371 (c)(1),
(2) Date: Oct. 17, 2019

(87) PCT Pub. No.: WO2018/194393
PCT Pub. Date: Oct. 25, 2018

(65) Prior Publication Data
US 2020/0122093 A1    Apr. 23, 2020

(30) Foreign Application Priority Data

Apr. 21, 2017 (KR) .................. 10-2017-0051625
Apr. 11, 2018 (KR) .................. 10-2018-0042301

(51) Int. Cl.
*C08J 5/22* (2006.01)
*B01J 41/13* (2017.01)
(Continued)

(52) U.S. Cl.
CPC ............ *C08J 5/2293* (2013.01); *B01D 61/44* (2013.01); *B01D 69/10* (2013.01); *B01D 69/12* (2013.01);
(Continued)

(58) Field of Classification Search
CPC .... C08J 5/2293; C08J 5/2281; C08J 2327/18; B01J 41/13; B01J 41/14; B01J 39/20;
(Continued)

(56) References Cited

U.S. PATENT DOCUMENTS 4,126,589 A * 11/1978 Hamada ............... C08J 5/225
521/31
4,357,218 A * 11/1982 Seko .................... C08J 5/22
204/252
4,423,157 A * 12/1983 Masuda ............... C08J 5/2293
204/296

FOREIGN PATENT DOCUMENTS

JP     2001323084 A     11/2001
JP     2004051685 A  *   2/2004
KR    20170113232 A     10/2017

OTHER PUBLICATIONS

Chamoulaud el al. "Chemical Modification of the Surface of a Sulfonated Membrane by Formation of a Sulfonamide Bond", Langmuir, 2004, vol. 20, No. 12, pp. 4989-4995 (Year: 2004).*
(Continued)

*Primary Examiner* — Michael Bernshteyn
(74) *Attorney, Agent, or Firm* — Renaissance IP Law Group LLP

(57) ABSTRACT

The present inventive concept relates to a method of preparing an ion-exchange membrane using a chemical modi-
(Continued)

fication and an ion-exchange membrane prepared thereby. More specifically, the present inventive concept relates to a method of preparing an ion-exchange membrane, which is characterized by modifying sulfonic acid groups of a perfluorinated sulfonic acid electrolyte membrane with carboxyl groups and includes chlorinating sulfonic acid groups of a perfluorinated sulfonic acid electrolyte membrane; nitrilating the chlorinated electrolyte membrane; and hydrolyzing the nitrilated electrolyte membrane, and an ion-exchange membrane chemically modified thereby.

18 Claims, 6 Drawing Sheets

(51) Int. Cl.
B01J 41/14 (2006.01)
B01D 61/44 (2006.01)
B01D 69/10 (2006.01)
B01D 69/12 (2006.01)
B01D 71/26 (2006.01)
B01D 71/36 (2006.01)
B01D 71/48 (2006.01)
B01D 71/56 (2006.01)
B01D 71/64 (2006.01)
B01D 71/66 (2006.01)
B01J 39/20 (2006.01)

(52) U.S. Cl.
CPC ............ B01D 71/26 (2013.01); B01D 71/36 (2013.01); B01D 71/48 (2013.01); B01D 71/56 (2013.01); B01D 71/64 (2013.01); B01D 71/66 (2013.01); B01J 41/13 (2017.01); B01J 41/14 (2013.01); C08J 5/2281 (2013.01); B01J 39/20 (2013.01); C08J 2327/18 (2013.01)

(58) Field of Classification Search
CPC ........ B01D 61/44; B01D 69/10; B01D 69/12; B01D 71/26; B01D 71/36; B01D 71/48; B01D 71/56; B01D 71/64; B01D 71/66
USPC .......................................................... 521/27
See application file for complete search history.

(56) References Cited

OTHER PUBLICATIONS

Choi et al. "Electrochemical Properties of Polyethylene Membrane Modified wish Carboxylic Acid Group", Radiation Physics and Chemistry, 2000, vol. 57, No. 2, pp. 179-186 (Year: 2000).*
Khodabakhshi et al. "Preparation, Optimization and Characterization of Novel Ion Exchange Membranes by Blending of Chemically Modified PVDF and SPPO", Separation and Purification Technology, 2012, vol. 90, pp. 10-21 (Year: 2012).*
Swaminathan et al. "Surface Modification of Ion Exchange Membrane Using Amines", Journal of Membrane Science, 2004, vol. 234, No. 1-2, pp. 131-137 (Year: 2004).*
Chamoulaud, Gwenaël et al., "Chemical Modification of the Surface of a Sulfonated Membrane by Formation of a Sulfonamide Bond", Langmuir 2004, 20, 12, 4989-4995, May 4, 2004.
Choi, S-H. et al., "Electrochemical properties of polyethylene membrane modified with carboxylic acid group", Radiation Physics and Chemistry vol. 57, Issue 2, Feb. 2000, pp. 179-186.
Hensley, Jesse E. et al., "The relationship between proton conductivity and water permeability in composite carboxylate/sulfonate perfluorinated ionomer membranes", Journal of Power Sources vol. 172, Issue 1, Oct. 11, 2007, pp. 57-66.
Khodabakhshi, A.R. et al., "Preparation, optimization and characterization of novel ion exchange membranes by blending of chemically modified PVDF and SPPO", Separation and Purification Technology, vol. 90, 2012, pp. 10-21.
Swaminathan, P. et al., "Surface modification of ion exchange membrane using amines", Journal of Membrane Science vol. 234, Issues 1-2, May 1, 2004, pp. 131-137.

* cited by examiner

FIG. 2
EXAMPLE 1 - AFTER FIRST STEP (CHLORINATION)
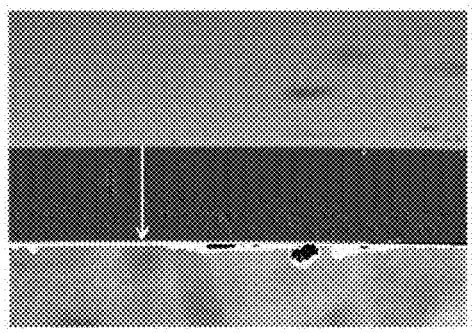 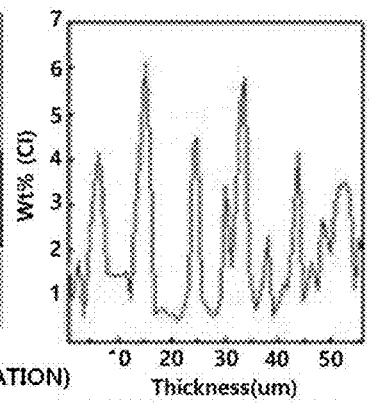
EXAMPLE 1 - AFTER SECOND STEP (NITRILATION)
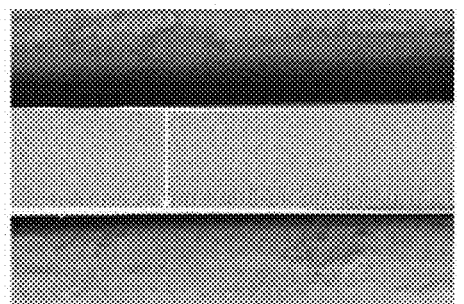 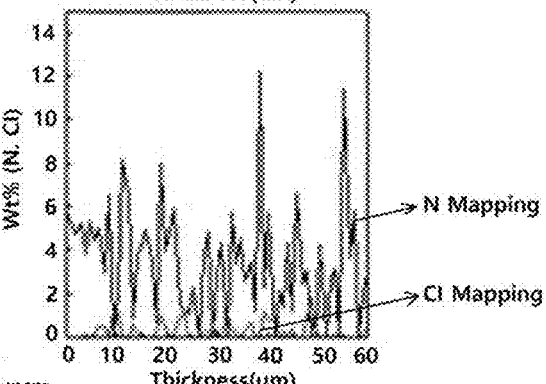
EXAMPLE 1 - AFTER THIRD STEP (HYDROLYSIS)
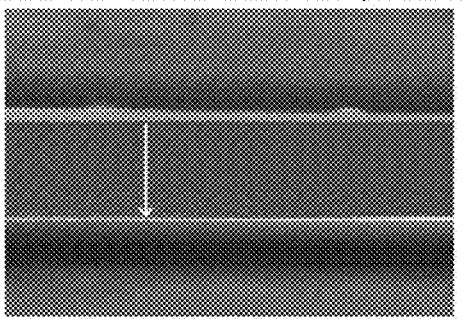 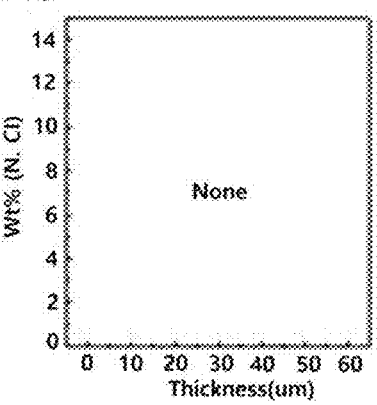

| | Sodium ion (Na⁺) Conductivity (S cm⁻¹) | |
|---|---|---|
| | 30 °C | 90 °C |
| Example 50 | 0.01087 | 0.04337 |
| Example 51 | 0.01081 | 0.04365 |
| Example 52 | 0.02108 | 0.04884 |
| Example 53 | 0.02114 | 0.04901 |
| Example 54 | 0.01156 | 0.03863 |
| Example 55 | 0.01149 | 0.03874 |
| Comparative Example 4 | 0.00251 | 0.01744 |

FIG. 7

| | Cell voltage at 0.6 A cm⁻² (V) | Energy consumption at 90 °C (MWh/ton Cl₂) | | Cell voltage at 0.6 A cm⁻² (V) | Energy consumption at 90 °C (MWh/ton Cl₂) |
|---|---|---|---|---|---|
| Example 1 | 3.10 | 2.12 | Example 32 | 3.11 | 2.18 |
| Example 2 | 3.17 | 2.17 | Example 33 | 3.10 | 2.17 |
| Example 3 | 3.11 | 2.15 | Example 34 | 3.09 | 2.16 |
| Example 4 | 3.08 | 2.17 | Example 35 | 3.10 | 2.17 |
| Example 5 | 3.12 | 2.18 | Example 36 | 3.10 | 2.18 |
| Example 6 | 3.08 | 2.17 | Example 37 | 3.11 | 2.17 |
| Example 7 | 3.11 | 2.16 | Example 38 | 3.08 | 2.16 |
| Example 8 | 3.13 | 2.17 | Example 39 | 3.12 | 2.18 |
| Example 9 | 3.09 | 2.16 | Example 40 | 3.08 | 2.16 |
| Example 10 | 3.08 | 2.18 | Example 41 | 3.11 | 2.17 |
| Example 11 | 3.08 | 2.18 | Example 42 | 3.13 | 2.18 |
| Example 12 | 3.11 | 2.16 | Example 43 | 3.09 | 2.16 |
| Example 13 | 3.16 | 2.15 | Example 44 | 3.08 | 2.16 |
| Example 14 | 3.15 | 2.16 | Example 45 | 3.08 | 2.16 |
| Example 15 | 3.19 | 2.18 | Example 46 | 3.11 | 2.17 |
| Example 16 | 3.16 | 2.17 | Example 47 | 3.11 | 2.17 |
| Example 17 | 3.17 | 2.14 | Example 48 | 3.08 | 2.16 |
| Example 18 | 3.18 | 2.18 | Example 49 | 3.13 | 2.18 |
| Example 19 | 3.20 | 2.19 | Example 50 | 2.90 | 2.19 |
| Example 20 | 3.11 | 2.19 | Example 51 | 2.91 | 2.07 |
| Example 21 | 3.07 | 2.18 | Example 52 | 2.97 | 2.10 |
| Example 22 | 2.98 | 2.15 | Example 53 | 2.88 | 2.00 |
| Example 23 | 2.99 | 2.16 | Example 54 | 2.85 | 2.05 |
| Example 24 | 3.15 | 2.18 | Example 55 | 2.89 | 2.11 |
| Example 25 | 2.97 | 2.17 | Comparative Example 1 | 3.49 | 2.51 |
| Example 26 | 3.06 | 2.16 | Comparative Example 2 | 3.41 | 2.50 |
| Example 27 | 3.04 | 2.19 | Comparative Example 3 | 3.75 | 2.60 |
| Example 28 | 3.12 | 2.20 | Comparative Example 4 | 3.34 | 2.48 |
| Example 29 | 3.08 | 2.18 | | | |
| Example 30 | 3.04 | 2.21 | | | |
| Example 31 | 3.05 | 2.16 | | | |

FIG. 8

| | OH⁻ ion permeability (cm²/sec) |
|---|---|
| Example 1 | $6.22 \times 10^{-5}$ |
| Example 50 | $8.63 \times 10^{-5}$ |
| Comparative Example 1 | $3.19 \times 10^{-5}$ |
| Comparative Example 4 | $1.17 \times 10^{-5}$ |

METHOD OF PREPARING ION-EXCHANGE MEMBRANE USING CHEMICAL MODIFICATION AND ION-EXCHANGE MEMBRANE PREPARED THEREBY

TECHNICAL FIELD

The present disclosure relates to a method of preparing an ion-exchange membrane using chemical modification and an ion-exchange membrane prepared thereby, and more particularly, to a method of preparing an ion-exchange membrane by substituting sulfonic acid groups ($-SO_3^-H^+$) of a perfluorinated sulfonic acid electrolyte membrane with carboxyl groups ($-COO^-H^+$) and the ion exchange membrane prepared thereby.

BACKGROUND ART

An ion-exchange membrane refers to a polymer membrane that selectively permeates anions and cations and is classified into a cation exchange membrane and an anion exchange membrane according to its charge characteristics, respectively. A cation exchange membrane has negatively charged functional groups, permeates only cations by electrical attraction, and blocks the movement of anions by electrostatic repulsion. In addition, an anion exchange membrane has positively charged functional groups, transports anions by electrical attraction, and blocks the movement of cations by electrostatic repulsion.

Such ion-exchange membranes are applied as polymer electrolyte membranes and electrode binder materials for saline water electrolysis, polymer electrolyte membrane fuel cell (PEMFC), solid alkaline fuel cell (SAFC), vanadium redox flow battery (VRFB), reverse electrodialysis (RED), polymer electrolyte membrane water electrolysis, alkaline polymer electrolyte membrane water electrolysis, electrodialysis (ED), and so on.

Among ion-exchange membranes, perfluorinated ion-exchange membranes with excellent thermal and chemical resistance have been used as representative cation exchange membranes for saline water electrolysis to prepare both chlorine gas and alkaline chemicals, polymer electrolyte membranes for ozone generators, fuel cells, water electrolysis and hydrochloric acid electrolysis.

These ion-exchange membranes should have high current efficiency and low electrochemical cell voltage in terms of productivity and economics perspective. To meet these requirements, double-layered ion-exchange membranes, which include a carboxylic acid layer having carboxyl groups with high anion exclusion capability and a sulfonic layer having sulfonic acid groups with low resistance to cations were developed.

For example, in Japanese Laid-Open Patent Publication No. 2001-323084, an ion-exchange membrane consisting of at least two layers including a fluorinated polymer layer having sulfonic acid groups and a fluorinated polymer layer having carboxyl groups is disclosed. In addition, in Korean Unexamined Patent Application No. 2017-0113232, a method of introducing various ion exchangers to a base membrane, which includes expanding a polymer electrolyte base membrane and performing a polymerization reaction of a monomer is disclosed.

However, in the method of preparing an ion-exchange membrane disclosed herein, since a different type of ion exchanger layer is formed using thermal compression or coating, the problem of interfacial delamination has not been solved, and this method also needs the improvement in performance, for example, the improvement in membrane strength or current efficiency.

DISCLOSURE

Technical Problem

The present disclosure is directed to providing a method of preparing an ion-exchange membrane by substituting sulfonic acid groups ($-SO_3^-H^+$) with carboxyl groups ($-COO^-H^+$) through the chemical modification of a polymer electrolyte membrane, thereby controlling a cation transport property and solving interfacial resistance between different types of layers in the preparation of multi-layered membrane and interfacial delamination according to the application of an electrochemical system.

The present disclosure is also directed to providing an ion-exchange membrane in which sulfonic acid groups is modified with carboxyl groups or some sulfonic acid groups are modified with carboxyl groups through chemical modification, thereby forming double-layered structure, and thus the ion-exchange membrane has excellent durability, high current efficiency, and no interfacial delamination.

Technical Solution

To solve the above-described problems, the present disclosure provides a method of preparing a cation-exchange membrane, which is characterized by selectively substituting sulfonic acid groups ($-SO_3^-H^+$) in a perfluorinated sulfonic acid electrolyte membrane with carboxyl groups ($-COO^-H^+$), the method comprising: a) chlorinating sulfonic acid groups in a perfluorinated sulfonic acid electrolyte membrane; b) nitrilating the chlorinated electrolyte membrane; and c) hydrolyzing the nitrilated electrolyte membrane, and an ion-exchange membrane prepared thereby.

Advantageous Effects

In the present disclosure, double-layered ion-exchange membranes including both sulfonic acid groups layer and carboxyl groups layer may be prepared by controlling the extent of chlorination of perfluorinated sulfuric acid ionomer-based ion-exchange membrane or restoring some sulfonic acid groups of chlorinated and nitrilated membranes. The double-layered ion-exchange membranes having different functional groups suitable for an applied characteristic can be prepared. In addition, a chemical modification method according to the present disclosure has the advantage of fundamentally preventing the interfacial resistance between different types of layers and interlayer delamination occurring in a multi-layered separator prepared by a physical heat-sealing method.

DESCRIPTION OF DRAWINGS

FIG. 2 shows the results of energy dispersive X-ray (EDX) analysis by steps of a reaction according to an example of the present inventive concept.

FIG. 7 is a table showing the performance and energy consumption of ion-exchange membranes prepared according to examples and comparative examples of the present inventive concept.

FIG. 8 shows the OH⁻ ion permeability of ion-exchange membranes prepared according to examples and comparative examples of the present inventive concept.

MODES OF THE INVENTION

Figure 1:
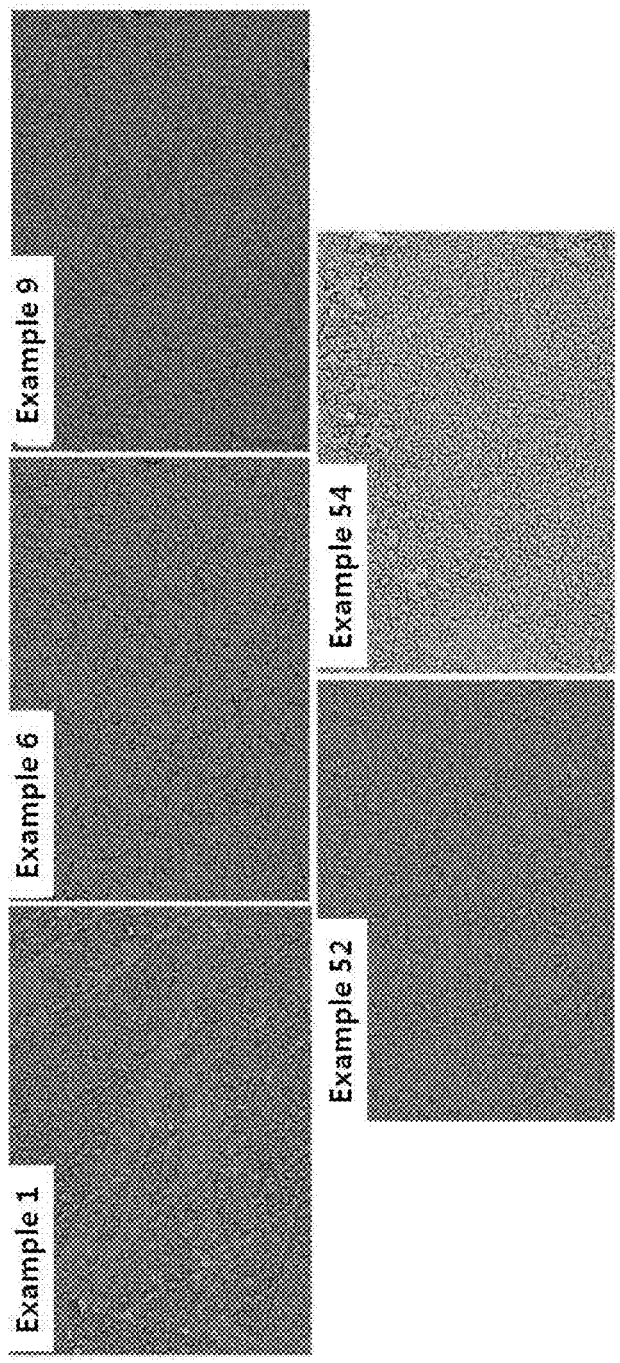
FIG. 1 is a set of scanning electron microscope (SEM) images of a modified ion-exchange membrane according to an example of the present disclosure showing whether the membrane surface is damaged over chlorination time.

The present inventive concept will be described in further detail with reference to examples and drawings.

A method of preparing an ion-exchange membrane according to the present inventive concept is characterized by selectively substituting sulfonic acid groups (—$SO_3^-H^+$) in a perfluorinated sulfonic acid electrolyte membrane with carboxyl groups (-$COO^-H^+$), the method comprising: a) chlorinating sulfonic acid groups in a perfluorinated sulfonic acid electrolyte membrane; b) nitrilating the chlorinated electrolyte membrane; and c) hydrolyzing the nitrilated electrolyte membrane.

In the present disclosure, while an ion-exchange membrane in which all sulfonic acid groups of a perfluorinated polymer electrolyte membrane are modified with carboxyl groups may be prepared, double-layered ion-exchange membranes including both sulfonic acid groups layer and carboxyl groups layer may be prepared by controlling chlorination to chlorinate some sulfonic acid groups or restoring some sulfonic acid groups before nitrilation.

The modification of an ion-exchange membrane according to the present inventive concept is described step by step with reference to Reaction Scheme 1.

[Reaction Scheme 1]

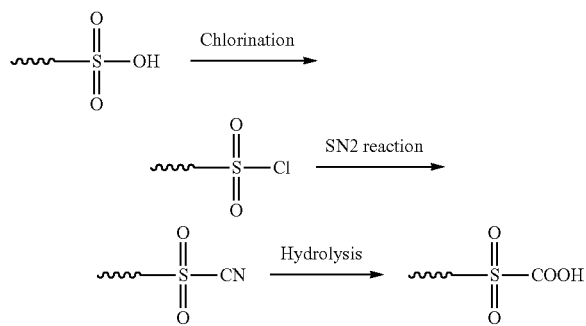

In the present disclosure, as seen from Reaction Scheme 1, modification is performed in three steps, which are, specifically, chemical modification of an ion-exchange membrane accomplished by sequentially performing chlorination (—OH→—Cl; first step), nitrilation via SN2 reaction (—Cl→—CN; second step) and nitrile hydrolysis (—CN→—COOH; third step).

As a perfluorinated sulfonic acid electrolyte membrane that can be used in the present disclosure, a perfluorinated sulfuric acid ionomer free-standing membrane or a reinforced composite membrane having porous supports may be used.

The perfluorinated sulfuric acid ionomer may be, for example, one or more selected from the group consisting of poly(perfluorosulfonic acid)s, sulfonic acid-containing-co-polymers composed of tetrafluoroethylene and fluorovinylether, and their mixtures thereof, but the present inventive concept is not limited thereto.

In addition, when a reinforced composite membrane is used as the perfluorinated sulfonic acid electrolyte membrane, a porous support included in the reinforced composite membrane may be, for example, a polymer such as polytetrafluoroethylene, poly(vinyl difluoroethylene), polyethylene, polypropylene, poly(ethylene terephthalate), polyimide and polyamide, but the present inventive concept is not particularly limited thereto.

Specifically, the chemical modification according to the present inventive concept will be described step by step as follows. First, in step a), the chlorination of the perfluorinated sulfonic acid electrolyte membrane may be performed by treating a perfluorinated polymer electrolyte membrane having sulfonic acid groups with a solution containing one or more compounds selected from the group consisting of $SOCl_2$, $MeSO_2Cl$, $PCl_5$, $POCl_3$, and dichloromethane (DCM), but the present inventive concept is not limited thereto. Any solution that can chlorinate sulfonic acid groups can be used without limitation. Generally, the concentration of the aqueous solution is preferably in a range of 0.5 to 20M.

In addition, the chlorination according to the present inventive concept is preferably performed at 10 to 110° C. The reaction time may be selectively adjusted according to how much chemical modification of sulfonic acid groups is required, but generally, a range of approximately 30 seconds to 24 hours is suitable. After chlorination, washing and drying are performed, followed by the following reaction.

Another aspect of the present inventive concept is for preparing an ion-exchange membrane having double-layered structure of sulfonic acid groups layer and carboxyl groups layer by controlling chlorination to substitute some sulfonic acid groups with carboxyl groups through chemical modification or by restoring some sulfonic acid groups before nitrilation as needed.

As such, the present inventive concept may further include restoring sulfonic acid groups before nitrilation. The restoration of sulfonic acid groups may be performed by treating the chlorinated electrolyte membrane with an alkaline aqueous solution containing one or more compounds selected from the group consisting of sodium hydroxide (NaOH), potassium hydroxide (KOH), lithium hydroxide (LiOH), beryllium hydroxide ($Be(OH)_2$) and calcium hydroxide ($Ca(OH)_2$), but the present inventive concept is not limited thereto, and any solution that can be restored into sulfonic acid groups may be used without limitation. Generally, the concentration of the alkaline aqueous solution is preferably in a range of 0.01 to 10M. In addition, the restoration of sulfonic acid groups is preferably performed at 10 to 100° C. for 30 seconds to 24 hours. After the restoration of sulfonic acid groups, washing and drying are performed, followed by the following reaction.

The nitrilation in step b) of the present inventive concept may be performed by treating the chlorinated perfluorinated polymer electrolyte membrane with a solution containing one or more compounds selected from the group consisting of potassium cyanide (KCN), acetonitrile (CH$_3$CN), potassium cyanate (KOCN), potassium thiocyanide (KSCN), sodium cyanate (NaOCN), silver cyanide (AgCN) and copper cyanide (CuCN), but the present inventive concept is not limited thereto. Any solution that can nitrilate a chlorine group can be used without limitation. Generally, the concentration of the aqueous solution is preferably in a range of 0.01 to 10M, and methylsulfonxide (DMSO) or de-ionized water may be used as a solvent.

In addition, the nitrilation is preferably performed at 10 to 120° C., and the reaction time is suitably 30 seconds to 24 hours. When the nitrilation is performed, washing and drying may be further included.

In addition, in step c), the hydrolysis may be performed by treating the nitrilated electrolyte membrane with an aqueous solution containing one or more compounds selected from the group consisting of sodium hydroxide (NaOH), potassium hydroxide (KOH), lithium hydroxide (LiOH), beryllium hydroxide (Be(OH)$_2$) and calcium hydroxide (Ca(OH)$_2$) or deionized water, but the present inventive concept is not specifically limited thereto. Generally, the concentration of the aqueous solution is preferably in a range of 0.01 to 10M, or deionized water is preferably used.

In addition, the hydrolysis is preferably performed in a range of 10° C. to the boiling point of the above-described aqueous solution (usually approximately 120° C.), and the reaction time is suitably in a range of approximately 30 seconds to 24 hours. In addition, after the hydrolysis, washing and drying may be further included.

Meanwhile, in the chemical modification method according to the present inventive concept, the reaction temperature and time range of each step may be suitably adjusted as needed, and although not specifically limited, when each reaction is performed less than the above-mentioned temperature and time ranges, sufficient chemical modification is not accomplished, and thus carboxyl groups layer prepared thereby becomes so thin that durability may be degraded, and when the reaction is performed exceeding the above-described ranges, the membrane may be damaged, and process efficiency may be reduced due to long-term reactions, resulting in cost problems. For this reason, the reactions are preferably performed in each condition range.

Hereinafter, the present inventive concept will be described in further detail with reference to specific examples. However, the following examples are provided to help in understanding the present inventive concept, but it should not be interpreted that the scope of the present inventive concept is limited thereto.

Example 1

Chlorination (the first step) was performed by reacting Nafion212, which is a perfluorinated polymer electrolyte membrane having sulfonic acid groups, in 5M SOCl$_2$/dichloromethane solution under a nitrogen atmosphere at 40° C. while stirring at 400 rpm for 4 hours. After the reaction, the resulting product was washed with dichloromethane for approximately 5 minutes and dried at 80° C. for 4 hours.

Nitrilation (the second step) was performed by preparing 0.01M KCN/DMSO:deionized water=50:50 vol % solution under a nitrogen atmosphere at 90° C. and stirring the ion-exchange membrane obtained in the first step at 600 rpm for 12 hours. After the reaction, the resulting product was washed with the used solvent for 30 minutes and dried at 80° C. for one day.

Finally, hydrolysis (the third step) was performed by reacting the nitrilated product with 0.01M HCl at room temperature for 2 hours and washing the resulting product in boiling water for 2 hours.

Example 2

A process was carried out in the same manner as described in Example 1, except that Nafion212 was stirred at a speed of 800 rpm for 2 hours at room temperature under air atmosphere in chlorination (the first step).

Example 3

A process was carried out in the same manner as described in Example 1, except that Nafion212 was stirred in 1M SOCl$_2$/dichloromethane solution at a speed of 800 rpm for 30 seconds in chlorination (the first step).

Example 4

A process was carried out in the same manner as described in Example 1, except that Nafion212 was stirred in 0.5M SOCl$_2$/dichloromethane solution at a speed of 600 rpm for 12 hours at 80° C. in chlorination (the first step).

Example 5

A process was carried out in the same manner as described in Example 1, except that Nafion212 was stirred at a speed of 200 rpm and 80° C. in chlorination (the first step).

Example 6

A reaction was carried out in the same manner as described in Example 1, except that Nafion212 was stirred in 1M MeSO$_2$Cl/dichloromethane solution at a speed of 800 rpm for 2 hours at room temperature under air atmosphere in chlorination (the first step).

Example 7

A process was carried out in the same manner as described in Example 1, except that Nafion212 was stirred in 0.5M MeSO$_2$Cl/dichloromethane solution at a speed of 800 rpm at room temperature under air atmosphere in chlorination (the first step).

Example 8

A process was carried out in the same manner as described in Example 1, except that Nafion212 was reacted in 5M MeSO$_2$Cl/dichloromethane solution for 24 hours at 10° C. under air atmosphere in chlorination (the first step).

Example 9

A process was carried out in the same manner as described in Example 1, except that Nafion212 was stirred in 1M PCl$_5$/POCl$_3$ solution at a speed of 600 rpm at 80° C. in chlorination (the first step).

Example 10

A process was carried out in the same manner as described in Example 1, except that Nafion212 was reacted in 0.5M $PCl_5/POCl_3$ solution for 12 hours at 80° C. in chlorination (the first step).

Example 11

A process was carried out in the same manner as described in Example 1, except that Nafion212 was stirred in 20M $PCl_5/POCl_3$ solution at a speed of 200 rpm for 2 hours at 110° C. in chlorination (the first step).

Example 12

A process was carried out in the same manner as described in Example 1, except that Nafion212 was stirred in 5M $PCl_5/POCl_3$ solution at a speed of 200 rpm for 8 hours at 110° C. in chlorination (the first step).

Example 13

A process was carried out in the same manner as described in Example 1, except that 5M KCN solution was prepared under air atmosphere and stirred in the ion-exchange membrane obtained in the first step at a speed of 200 rpm for 2 hours in nitrilation (the second step).

Example 14

A process was carried out in the same manner as described in Example 1, except that the ion-exchange membrane obtained in the first step was stirred at a speed of 1000 rpm for 15 hours at room temperature in nitrilation (the second step).

Example 15

A process was carried out in the same manner as described in Example 1, except that 5M KCN solution was prepared under air atmosphere at 120° C. and reacted with the membrane obtained in the first step for 30 seconds in nitrilation (the second step).

Example 16

A process was carried out in the same manner as described in Example 1, except that the membrane obtained in the first step was reacted with DMSO:deionized water=25:75 vol % solvent at a speed of 1000 rpm for 15 hours at room temperature in nitrilation (the second step).

Example 17

A process was carried out in the same manner as described in Example 1, except that 0.1M KCN/DMSO:deionized water=25:75 vol % solution was prepared under air atmosphere and reacted with the membrane obtained in the first step for 2 hours in nitrilation (the second step).

Example 18

A reaction was carried out in the same manner as described in Example 1, except that 0.01M acetonitrile/DMSO:deionized water=50:50 vol % solution was prepared at 10° C. to be stirred with the membrane obtained in the first step at a speed of 1000 rpm for 24 hours in nitrilation (the second step).

Example 19

A process was carried out in the same manner as described in Example 1, except that 5M acetonitrile aqueous solution was prepared under air atmosphere and stirred with the membrane obtained in the first step at a speed of 400 rpm for 2 hours in nitrilation (the second step).

Example 20

A process was carried out in the same manner as described in Example 1, except that 0.01M potassium cyanate (KOCN)/DMSO:deionized water=50:50 vol % solution was prepared at room temperature and stirred with the membrane obtained in the first step at a speed of 1000 rpm for 15 hours in nitrilation (the second step).

Example 21

A process was carried out in the same manner as described in Example 1, except that 10M potassium cyanate aqueous solution was prepared under air atmosphere to be stirred with the membrane obtained in the first step at a speed of 400 rpm for 2 hours in nitrilation (the second step).

Example 22

A process was carried out in the same manner as described in Example 1, except that 0.01M potassium thiocyanide (KSCN)/DMSO:deionized water=50:50 vol % solution was prepared at room temperature to be stirred with the membrane obtained in the first step at a speed of 1000 rpm for 15 hours in nitrilation (the second step).

Example 23

A process was carried out in the same manner as described in Example 1, except that 5M potassium thiocyanide aqueous solution was prepared under air atmosphere to be stirred with the membrane obtained in the first step at a speed of 400 rpm for 2 hours in nitrilation (the second step).

Example 24

A process was carried out in the same manner as described in Example 1, except that 0.01M sodium cyanate (NaOCN)/DMSO:deionized water=50:50 vol % solution was prepared at room temperature to be stirred with the membrane obtained in the first step at a speed of 1000 rpm for 15 hours in nitrilation (the second step).

Example 25

A process was carried out in the same manner as described in Example 1, except that 10M sodium cyanate aqueous solution was prepared under air atmosphere to be stirred with the membrane obtained in the step 1 at a speed of 400 rpm for 2 hours in nitrilation (the second step).

Example 26

A process was carried out in the same manner as described in Example 1, except that 0.01M silver cyanide (AgCN)/

DMSO:deionized water=50:50 vol % solution was prepared at room temperature to be stirred with the membrane obtained in the first step at a speed of 1000 rpm for 15 hours, followed by washing for 6 hours 10 times in nitrilation (the second step).

Example 27

A process was carried out in the same manner as described in Example 1, except that 5M silver cyanide aqueous solution was prepared under air atmosphere to be stirred with the membrane obtained in the first step at a speed of 400 rpm for 2 hours, followed by washing for 6 hours 10 times in nitrilation (the second step).

Example 28

A process was carried out in the same manner as described in Example 1, except that 0.01M copper cyanide (CuCN)/DMSO:deionized water=50:50 vol % solution was prepared at room temperature to be stirred with the membrane obtained in the first step at a speed of 1000 rpm for 15 hours, followed by washing for 6 hours 10 times in nitrilation (the second step).

Example 29

A process was carried out in the same manner as described in Example 1, except that 5M copper cyanide aqueous solution was prepared under air atmosphere to be stirred with the membrane obtained in the first step at a speed of 400 rpm for 2 hours, followed by washing for 6 hours 10 times in nitrilation (the second step).

Example 30

A process was carried out in the same manner as described in Example 1, except that the reaction product was reacted in a solution at the boiling point thereof for 1 hour in hydrolysis (the third step).

Example 31

A process was carried out in the same manner as described in Example 1, except that the reaction product was reacted in 1M hydrochloric acid aqueous solution at the boiling point for 12 hours in hydrolysis (the third step).

Example 32

A process was carried out in the same manner as described in Example 1, except that the reaction product was reacted in a sulfuric acid ($H_2SO_4$) aqueous solution at the boiling point for 1 hour in hydrolysis (the third step).

Example 33

A process was carried out in the same manner as described in Example 1, except that the reaction product was reacted in 1M sulfuric acid aqueous solution at the boiling point for 15 hours in hydrolysis (the third step).

Example 34

A process was carried out in the same manner as described in Example 1, except that the reaction product was reacted in a phosphoric acid ($H_3PO_4$) aqueous solution at the boiling point for 1 hour in hydrolysis (the third step).

Example 35

A process was carried out in the same manner as described in Example 1, except that the reaction product was reacted in 1M phosphoric acid aqueous solution at the boiling point for 24 hours in hydrolysis (the third step).

Example 36

A process was carried out in the same manner as described in Example 1, except that the reaction product was reacted in a nitric acid ($HNO_3$) aqueous solution at the boiling point for 1 hour in hydrolysis (the third step).

Example 37

A process was carried out in the same manner as described in Example 1, except that the reaction product was reacted in a nitric acid aqueous solution at 60° C. for 1.5 hours in hydrolysis (the third step).

Example 38

A process was carried out in the same manner as described in Example 1, except that the reaction product was reacted in deionized water at the boiling point thereof for 1 hour in hydrolysis (the third step).

Example 39

A process was carried out in the same manner as described in Example 1, except that the reaction product was reacted in deionized water at 60° C. for 1.5 hours in hydrolysis (the third step).

Example 40

A process was carried out in the same manner as described in Example 1, except that the reaction product was reacted in a sodium hydroxide (NaOH) aqueous solution at room temperature for 2 hours in hydrolysis (the third step).

Example 41

A process was carried out in the same manner as described in Example 1, except that the reaction product was reacted in 1M sodium hydroxide aqueous solution at the boiling point thereof for 0.5 hours in hydrolysis (the third step).

Example 42

A process was carried out in the same manner as described in Example 1, except that the reaction product was reacted in a potassium hydroxide (KOH) aqueous solution at room temperature for 2 hours in hydrolysis (the third step).

Example 43

A process was carried out in the same manner as described in Example 1, except that the reaction product was reacted in 1M potassium hydroxide aqueous solution at the boiling point thereof for 0.5 hours in hydrolysis (the third step).

Example 44

A process was carried out in the same manner as described in Example 1, except that the reaction product was reacted in 10M lithium hydroxide (LiOH) aqueous solution at 10° C. for six hours in hydrolysis (the third step).

Example 45

A process was carried out in the same manner as described in Example 1, except that the reaction product was reacted in 1M lithium hydroxide aqueous solution at the boiling point thereof for 30 seconds in hydrolysis (the third step).

Example 46

A process was carried out in the same manner as described in Example 1, except that the reaction product was reacted in 5M beryllium hydroxide ($Be(OH)_2$) aqueous solution at room temperature for 12 hours in hydrolysis (the third step).

Example 47

A process was carried out in the same manner as described in Example 1, except that the reaction product was reacted in 1M beryllium hydroxide ($Be(OH)_2$) aqueous solution at the boiling point thereof for 0.5 hours in hydrolysis (the third step).

Example 48

A process was carried out in the same manner as described in Example 1, except that the reaction product was reacted in a calcium hydroxide ($Ca(OH)_2$) aqueous solution at room temperature for 24 hours in hydrolysis (the third step).

Example 49

A process was carried out in the same manner as described in Example 1, except that the reaction product was reacted in 1M calcium hydroxide aqueous solution at 120° C. for 0.5 hours in hydrolysis (the third step).

Example 50

A process was carried out in the same manner as described in Example 1, except that one surface of the membrane obtained after a two-step reaction between the chlorination (the first step) and the nitrilation (the second step) of Example 1 was exposed to 0.01M sodium hydroxide aqueous solution at room temperature, and then stirring at a speed of 100 rpm for 2 hours was added.

Example 51

A process was carried out in the same manner as described in Example 1, except that one surface of the membrane obtained after a two-step reaction between the chlorination (the first step) and the nitrilation (the second step) of Example 1 was exposed to 1M potassium hydroxide aqueous solution at room temperature, and then stirring at a speed of 50 rpm for 6 hours was added.

Example 52

A process was carried out in the same manner as described in Example 50, except that a membrane on which a perfluorosulfonic acid (PFSA) dispersion (3M E-22122, EW:800; commercially available from 3M) was cast to a thickness of 50 μm was exposed to 0.01M lithium hydroxide aqueous solution and stirring was performed for 12 hours.

Example 53

A process was carried out in the same manner as described in Example 51, except that a membrane on which a PFSA dispersion (3M E-22122, EW:800; commercially available from 3M) was cast to a thickness of 50 μm was exposed to 1M beryllium hydroxide aqueous solution and stirring was performed at 10° C. for 24 hours.

Example 54

A process was carried out in the same manner as described in Example 50, except that a membrane on which a PFSA dispersion (Acquivion D79-25BS, EW:790; commercially available from Solvay) was cast to a thickness of 50 μm was exposed to a 10M calcium hydroxide aqueous solution and stirring was performed at 100° C. for 30 seconds.

Example 55

A process was carried out in the same manner as described in Example 51, except that a membrane on which PFSA dispersion (Acquivion D79-25BS, EW:790; commercially available from Solvay) was cast to a thickness of 50 μm was exposed to 1M potassium hydroxide aqueous solution and stirring was performed for 18 hours.

Example 56

A process was carried out in the same manner as described in Example 50, except that a Nafion™ XL membrane, which is a reinforced composite membrane produced by DuPont, was exposed to 0.01M lithium hydroxide aqueous solution and stirring was performed for 12 hours.

Comparative Example 1

An ion-exchange membrane Nafion212 commercially available from DuPont was used.

Comparative Example 2

A membrane in which a PFSA dispersion (3M E-22122, EW:800; commercially available from 3M) was cast to a thickness of 50 μm was used.

Comparative Example 3

A membrane in which a PFSA dispersion (Acquivion D79-25BS, EW:790; commercially available from Solvay) was cast to a thickness of 50 μm was used.

Comparative Example 4

An Aciplex™ F membrane, which is a commercialization membrane produced by Asahi-Kasei Corp., was used.

Comparative Example 5

A Nafion™ XL membrane, which is a reinforced composite membrane produced by DuPont, was used.

<Experimental Example 1> Scanning Electron Microscopy

In order to check and determine the damage to membranes due to chlorination, which is the first step reaction, in Examples 1, 6, 9, 52 and 54, surface analysis was performed using a scanning electron microscope, and SEM images of the respective membranes are shown in FIG. 1. As shown in FIG. 1, it can be confirmed that there were no damages to the membranes due to chlorination.

<Experimental Example 2> EDX Analysis

EDX analysis was performed to observe the distribution of elements according to the reaction in each step of Example 1. As shown in FIG. 2, the distribution of Cl (chlorine) elements after chlorination (the first step) was confirmed, the distribution of N (nitrogen) elements according to the introduction of a CN group after nitrilation (the second step) was confirmed, and finally, the dissipation of Cl and N elements after hydrolysis (the third step) was confirmed, thereby confirming the change in surface functional group by reaction step.

<Experimental Example 3> Analysis of FT-IR Spectra

Figure 3:
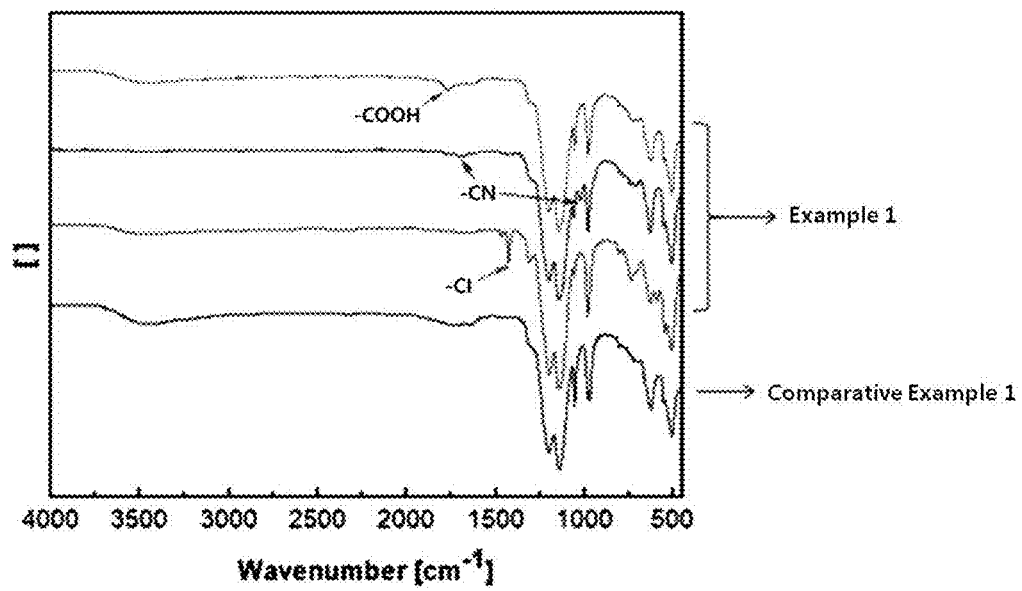
FIG. 3 is a graph showing principal attenuated total reflection (ATR) spectra by steps of a reaction of an example and a comparative example of the present inventive concept.

In order to confirm substitution, that is, surface modification, of a functional group according to the reaction in each step of Example 1, ATR FT-IR was performed on the membrane obtained in each reaction, and the result is shown in FIG. 3.

Figure 4:
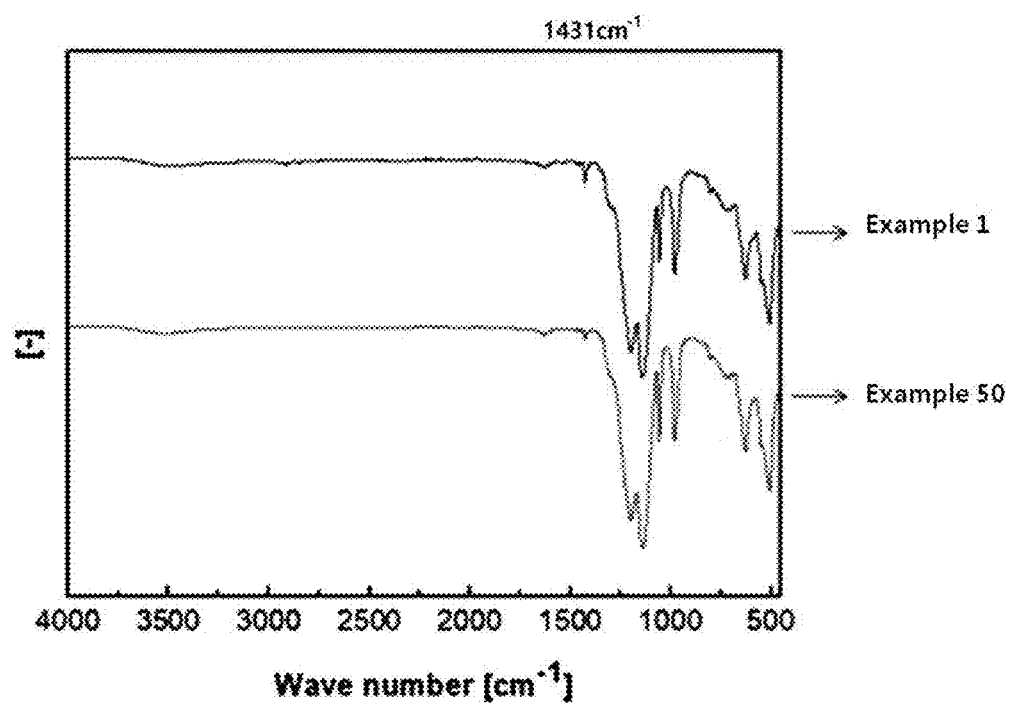
FIG. 4 is a Fourier transform infrared (FT-IR) graph that can confirm the extent of chlorination of an ion-exchange membrane according to examples of the present inventive concept.

In addition, FT-IR was performed for Example 50, in which one side of the chlorinated membrane is sulfonated again, and the result is shown in FIG. 4. ATR spectra of Example 50 showed the reduction in the —Cl peak of a KOH-exposed surface, and the degree of chlorination was adjusted according to a thickness by partially sulfonating the membrane obtained by chlorination (the first step) through an alkaline reaction. Meanwhile, the chlorinated membrane layer excluding the sulfonated membrane layer is modified with carboxyl groups layer through nitrilation (the second step) and hydrolysis (the third step). As such, the reaction carried out according to Example 50 has a significant meaning since it shows that carboxyl groups layer and sulfonic acid groups layer are present in double layers.

<Experimental Example 4> Measurement of Ion Conductivity

The $Na^+$ conductivity of the electrolyte membranes prepared using the membranes modified with carboxyl groups, which are described in Examples 50 to 56 and Comparative Example 4, was measured. The Na+ ion conductivity was calculated by the following Formula 1 after ohmic resistance or bulk resistance was measured using a four-point probe AC impedance spectroscopic method.

$$\sigma = L/RS \quad \text{[Formula 1]}$$

[In Formula 1, σ: Na+ conductivity (S/cm), R: ohmic resistance (Ω) of polymer electrolyte, L: distance (cm) between electrodes, S: area ($cm^2$) in electrolyte with constant current]

Figures 5, 6:
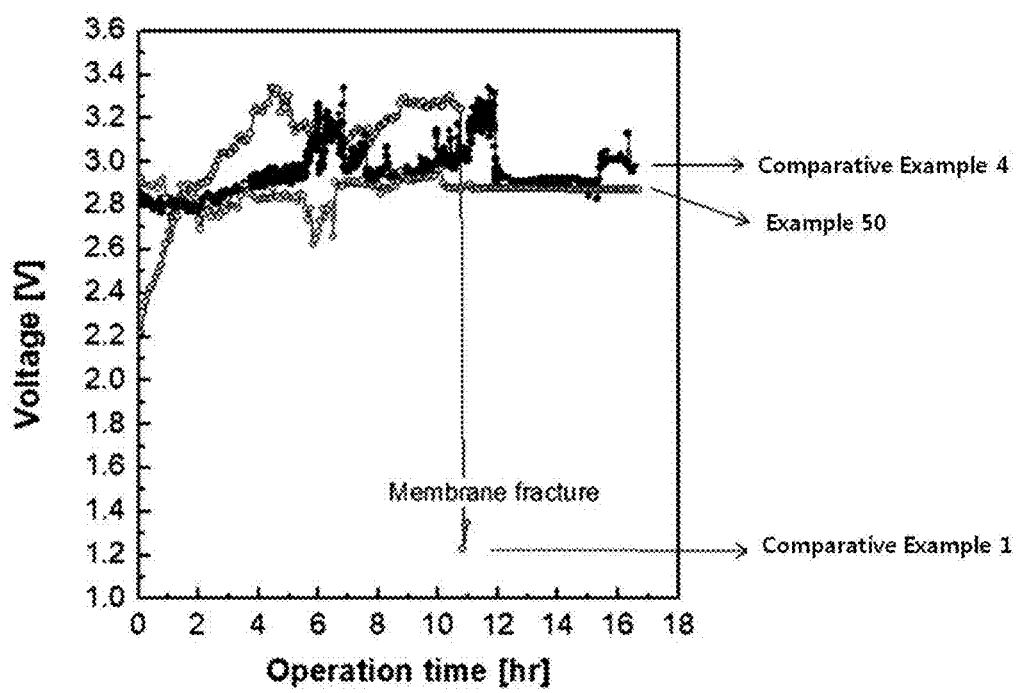
FIG. 5 shows the sodium (Nat) ion conductivity of ion-exchange membranes prepared according to examples and comparative examples of the present inventive concept.
FIG. 6 is a graph showing electrochemical durability induced by the application of constant current to ion-exchange membranes prepared according to an example and comparative examples of the present inventive concept.

The conductivity for each example is shown in the table of FIG. 5.

Referring to FIG. 5, it can be seen that Examples 50 to 56 showing the partially modified double-layered membranes, which is carboxyl groups-sulfonic acid group double-layered membrane having a partial carboxyl group layer due to adjusting the degree of chlorination, exhibit more improved conductivity than Comparative Example 4 showing a representative commercialized carboxyl group-sulfonic acid group double-layered membrane.

<Experimental Example 5> Analysis of Voltage-Current Characteristic

FIG. 6 is a graph showing the voltage-current characteristic of the ion-exchange membranes prepared according to the comparative examples and an example. The electrochemical durability was confirmed by creating an accelerating condition through circulation in a 30 wt % NaOH solution and a 25 wt % NaCl solution at 90° C. at a flow rate of 25 mL/min while supplying a constant current of 0.2 A/$cm^2$ for more than 11 hours.

It can be seen that, when driven under the electrochemical acceleration condition, Comparative Example 1 showing the single membrane having sulfonic acid groups exhibits a dramatic degradation in performance due to membrane damage (e.g., the formation of partial defects) after 11 hours, but Example 50 and Comparative Example 4 showing a partial carboxyl group maintain relatively stable voltages. According to the result, it can be seen that, despite very long-term operation, the ion-exchange membrane prepared according to Example 1 of the present inventive concept exhibits excellent electrochemical durability compared to the commercialized ion-exchange membrane of Comparative Example 1, and therefore, it can be confirmed that chemical durability increased according to the formation of a carbonized membrane of the present inventive concept.

<Experimental Example 6> Measurement of Cell Performance and Energy Consumption

Meanwhile, FIG. 7 shows a table of the comparison of performance and energy consumption for all of the examples and comparative examples. Comparative Example 4, which is the representative carboxyl group-sulfonic acid group double-layered membrane, shows high performance due to low cell voltage and energy consumption at 0.6 A $cm^{-2}$, compared to Comparative Examples 1, 2, 3 and 5. In addition, referring to the table of FIG. 7, it can be seen that Examples 1 to 49, which are single membranes modified with carboxyl groups, exhibit similar or slightly higher performance compared to Comparative Example 4, and Examples 50 to 56, which are double-layered membranes partially modified with carboxyl groups, exhibit improved performance compared to Comparative Example 4.

<Experimental Example 7> Ion Permeability

The $OH^-$ ion permeability using a back-diffusion cell of the ion-exchange membranes prepared according to Examples 1 and 50 and Comparative Examples 1 and 4 was confirmed, and the result is shown in FIG. 8. The ion-exchange membranes used in the measurement were fixed in the center of cells filled with DI water titrated to pH of 2 and 30.7 wt. % NaOH solution, respectively, such that ion conductivity over time at 90° C. was measured. The measured values were compared with the titration table according to NaOH concentration and substituted into the following Expression 1 to confirm the diffusion behavior and permeation characteristic of $OH^-$ ions.

$$P(cm^2/sec) = V_B(cm3) \times l(\mu m)/mol_A(mmol) \times A(cm^2) \cdot (mmol_B/t(sec))f \quad \text{[Expression 1]}$$

As a result of the test, it can be confirmed that the ion-exchange membrane prepared according to Expression 1, which is carboxyl groups single layer, exhibited very high OH⁻ ion barrier property, and the ion-exchange membrane according to Example 50 having carboxyl groups-sulfonic acid group double-layered structure also had relatively high OH– ion barrier property due to the carboxyl group. In addition, Examples 1 and 50, compared to Comparative Example 4 having the same structure, that is, Aciplex, exhibited improved ion barrier property. Particularly, Table 3 can show that Example 1 is carboxyl groups single membrane and exhibits the highest barrier property to anion permeation. Therefore, in Examples 1 and 50, in terms of the ion barrier properties according to the thickness of carboxyl groups, it is expected that the carboxyl group layer prevents the diffusion of the same type of ions in electrolysis and contributes to improvement in electrochemical performance.

The invention claimed is:

1. A method of preparing a cation-exchange membrane by selectively substituting sulfonic acid groups in a perfluorinated sulfonic acid electrolyte membrane with carboxyl groups, the method comprising:
   a) chlorinating sulfonic acid groups in a perfluorinated sulfonic acid electrolyte membrane;
   b) nitrilating the chlorinated electrolyte membrane; and
   c) hydrolyzing the nitrilated electrolyte membrane.

2. The method of claim 1, wherein, in the step a), sulfonic acid groups in the perfluorinated sulfonic acid electrolyte membrane are selectively chlorinated.

3. The method of claim 1, further comprising an additional step to selectively restore sulfonic acid groups prior to the nitrilation in the step b).

4. The method of claim 2, wherein sulfonic acid groups in one side surface of the perfluorinated sulfonic acid electrolyte membrane are selectively chemically substituted with carboxyl groups, thereby having double-layered structure.

5. The method of claim 1, wherein all of the sulfonic acid groups in the whole perfluorinated sulfonic acid electrolyte membrane are chemically substituted with carboxyl groups.

6. The method of claim 1, wherein the perfluorinated sulfonic acid electrolyte membrane is a perfluorinated sulfuric acid ionomer free-standing membrane or a reinforced composite membrane including porous supports.

7. The method of claim 6, wherein the perfluorinated sulfuric acid ionomer is selected from the group consisting of poly(perfluorosulfonic acid)s, sulfonic acid-containing-copolymers composed of tetrafluoroethylene and fluorovinylether, and their mixtures thereof.

8. The method of claim 6, wherein the porous supports of the reinforced composite membrane are selected from the group consisting of polytetrafluoroethylene, poly(vinyl difluoroethylene), polyethylene, polypropylene, poly(ethylene terephthalate), polyimide and polyamide.

9. The method of claim 1, wherein the chlorination is performed by treating the perfluorinated sulfonic acid electrolyte membrane with a solution including one or more compounds selected from the group consisting of $SOCl_2$, $MeSO_2Cl$, $PCl_5$, $POCl_3$, and dichloromethane (DCM).

10. The method of claim 1, wherein the chlorination is performed at 10 to 110° C. for 30 seconds to 24 hours.

11. The method of claim 3, wherein the restoration of sulfonic acid groups is performed by treating the electrolyte membrane with a solution including one or more compounds selected from the group consisting of NaOH, KOH, LiOH, $Be(OH)_2$, and $Ca(OH)_2$.

12. The method of claim 3, wherein the restoration of sulfonic acid groups is performed at 10 to 100° C. for 30 seconds to 24 hours.

13. The method of claim 3, wherein the restoration of sulfonic acid groups further comprises washing and drying after the reaction.

14. The method of claim 1, wherein the nitrilation is performed by treating the chlorinated electrolyte membrane with a solution including one or more compounds selected from the group consisting of KCN, $CH_3CN$, KOCN, KSCN, NaOCN, AgCN, and CuCN.

15. The method of claim 1, wherein the nitrilation is performed in a range of 10 to 120° C. for 30 seconds to 24 hours.

16. The method of claim 1, wherein the hydrolysis is performed by treating the nitrilated electrolyte membrane with an aqueous solution or deionized water which contains one or more compounds selected from the group consisting of HCl, $H_2SO_4$, $H_3PO_4$, $HNO_3$, NaOH, KOH, LiOH, $Be(OH)_2$, and $Ca(OH)_2$.

17. The method of claim 1, wherein the hydrolysis is performed at 10 to 120° C. for 30 seconds to 24 hours.

18. The method of claim 1, wherein each of the chlorination, the nitrilation and the hydrolysis further comprises washing and drying after the reaction.

* * * * *